(12) United States Patent
Lasher et al.

(10) Patent No.: US 6,560,382 B1
(45) Date of Patent: May 6, 2003

(54) SYSTEM FOR ALTERNATELY DIRECTING OPTICAL ENERGY THROUGH MULTIPLE OPTICAL MODULATION CHANNELS

(75) Inventors: Markham E. Lasher, La Jolla, CA (US); Weldon J. Dahlke, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/252,695

(22) Filed: Feb. 18, 1999

(51) Int. Cl.⁷ ............................. G02B 6/26; G02B 6/42; G02F 1/295; G02F 1/335
(52) U.S. Cl. ........................... 385/16; 385/4; 385/5; 385/7
(58) Field of Search ................... 385/7, 11, 15, 385/16, 17, 18, 22, 24, 27, 39, 42, 44, 45, 48, 4, 5, 9

(56) References Cited

U.S. PATENT DOCUMENTS

| | | | |
|---|---|---|---|
| 4,000,493 A | 12/1976 | Spaulding et al. | 347/255 |
| 4,449,212 A | 5/1984 | Reno | 369/44 |
| 4,516,837 A * | 5/1985 | Soref et al. | 349/196 |
| 4,824,220 A | 4/1989 | Yamamoto et al. | 359/305 |
| 4,885,589 A * | 12/1989 | Edward et al. | 342/175 |
| 4,957,362 A * | 9/1990 | Peterson | 356/5 |
| H844 H * | 11/1990 | Otto et al. | 363/178 |
| 4,991,924 A * | 2/1991 | Shankar et al. | 349/196 |
| 5,151,813 A | 9/1992 | Yamamoto et al. | 359/202 |
| 5,296,963 A | 3/1994 | Murakami et al. | 359/389 |
| 5,299,049 A | 3/1994 | Saito et al. | 359/196 |
| 5,311,217 A * | 5/1994 | Guerin et al. | 346/108 |
| 5,369,266 A * | 11/1994 | Nohda et al. | 250/208.1 |
| 5,381,258 A | 1/1995 | Bordignon et al. | 359/202 |
| 5,504,722 A * | 4/1996 | Tanaka et al. | 369/13 |
| 5,537,256 A * | 7/1996 | Fergason | 359/495 |
| 5,812,253 A * | 9/1998 | Nishikawa | 356/71.3 |
| 5,926,297 A * | 7/1999 | Ishikawa et al. | 359/115 |
| 5,970,185 A * | 10/1999 | Baker et al. | 385/3 |
| 6,061,103 A * | 5/2000 | Okamura et al. | 348/767 |
| 6,208,458 B1 * | 3/2001 | Galvanauskas et al. | 359/345 |
| 6,208,673 B1 * | 3/2001 | Miyake | 372/22 |

* cited by examiner

*Primary Examiner*—Brian Healy
*Assistant Examiner*—Kevin S Wood
(74) *Attorney, Agent, or Firm*—Celia C. Dunham; James A. Ward; Michael A. Kagan

(57) ABSTRACT

A system for alternately directing optical energy through multiple optical modulation channels includes an optical switch having first and second optical output ports for alternately directing an optical signal at full input power out of first and second optical output ports; a first optical modulation channel for modulating the output signal received from the first optical output port; and a second optical modulation channel for modulating the output signal received from the second output port. The optical switch includes a Pockels cell and a birefringent mirror. The Pockels cell transforms a first polarization state of the optical signal into a second polarization state in response to receiving an input signal. The birefringent mirror allows the optical signal to propagate along a first axis when the optical signal has a first polarization state, and directs the optical signal along a second axis when the optical signal has a second polarization state.

4 Claims, 6 Drawing Sheets

SYSTEM FOR ALTERNATELY DIRECTING OPTICAL ENERGY THROUGH MULTIPLE OPTICAL MODULATION CHANNELS

The present invention relates to the field of electro-optical displays, and more particularly to an optical imaging system in which a coherent optical signal is alternately directed through multiple optical modulation channels to increase the throughput rate of the system by avoiding delays caused by the time responses of the separate modulation channels.

BACKGROUND OF THE INVENTION

Three dimensional (3D) volumetric displays project images in a true three-dimensional volume. This allows observers to view the image from any angle and has obvious advantages in terms of depth and contour perception. A 3D display operates by projecting voxels, which constitute each point in the 3D image. The voxels are projected into a three dimensional volume. A voxel is the 3D analogue of a pixel, the latter representing a point of a two dimensional image.

Projected 3D displays can be effectively produced using a visible laser illumination source in conjunction with a laser scanner. Each voxel is located at a specific x, y, and z coordinates in space. The x,y coordinates determine the location of the voxel in the plane that is generally perpendicular to the beam propagation axis, while the z coordinate represents location of the voxel along the laser beam propagation axis. A beam deflector directs the laser beam to the x,y location of the voxel. The z or third coordinate of the voxel must also be established in order to produce the 3D image. This can be accomplished by temporarily locating a screen or other suitable scattering surface at the x,y, and z coordinates of the voxel.

An effective method for establishing the z coordinate of each voxel is to use a rotating helical surface. As the helix rotates about an axis that is oriented parallel to the laser propagation axis it provides a projection surface that varies along the z axis in a repetitive, regular manner. At any given time in the rotational cycle the points on the helical surface can be identified with specific x, y, and z coordinates. And in the course of one complete rotational cycle the helical surface will pass through all x, y, and z coordinates contained within the scanning volume. The dimensions of the scanning volume are defined by the overall dimensions of the rotating helix.

If a steady laser beam is projected towards the rotating helical surface at fixed x,y coordinates, it appears to the observer to be moving back and forth along the z axis. When x,y deflection is provided for the laser beam 3D images may be created since the projection screen moves through all x, y, and z coordinates in the scanning volume during each cycle. The 3D image is created voxel by voxel. As long as all voxels are generated within the time determined by human retinal persistence (about $1/20$ of a second) the image appears continuously and produces no flicker.

There are two types of x,y laser scanning techniques that have been used in conjunction with a spinning helix to produce 3D volumetric displays. The first is raster scanning, where all x and y coordinates are addressed in a sequential fashion, generally line by line. For x,y pairs that are not needed to produce an image voxel the laser beam is blanked, or turned off. The second scanning technique is called random access scanning. This technique directs the laser beam to only those x,y pairs that are required to produce the image voxels. Each x,y coordinate is loaded into the scanning apparatus as required to form the image. Random access scanning is a more efficient manner of creating a 3D image.

Modem volumetric displays utilize acousto-optic deflectors to direct the laser beam to the x,y coordinates of each voxel. An acousto-optic deflector contains a transparent optical crystal through which the beam passes. An acoustic wave is generated in the crystal in the plane of the propagation axis of the laser. By creating periodic variations in the refractive index of the crystal the acoustic wave generates a transmission-type diffraction grating through which the beam must propagate. The frequency of the standing acoustic wave determines the period of the grating, which in turn determines the angular deflection of the laser beam.

Establishing a grating within the acousto-optic crystal takes some time. The grating dimension transverse to the laser propagation direction must be at least as large as the laser beam diameter. In addition, each time new x,y coordinates are desired a new grating with a different period must be established within the crystal. The time required to produce the grating with the proper dimensions in the crystal is termed the access time or fill time of the crystal. During the access time the laser beam is blanked to avoid unwanted artifacts in the image. This reduces the optical throughput efficiency of the scanner and prevents efficient image projection. For the extreme case where the access time is equal to the voxel "on time the scanner efficiency is zero.

Another problem limiting the efficiency of scanners used in current 3D volumetric displays is related to the manner in which the laser light is utilized. Typically for high speed volumetric displays more than one acousto-optic bean deflector is utilized. This is done to increase the total number of voxels in a 3D projected image. Each x,y beam deflector is located in a separate "channel. The input laser beam must be divided among the various channels reducing the maximum instantaneous laser intensity available for each voxel to the total laser power divided by the number of channels. However, the minimum amount of laser power per voxel is determined by the power required to produce a visible voxel, that is, a voxel that may be observed. Therefore the effect of dividing the input laser power into two or more channels reduces the visibility of each voxel for a given laser input power and voxel on-time.

Thus, it may be appreciated that there is a need for a high speed random access laser scanner that provides accurate 3D volumetric display images in a manner that makes efficient use of the total input laser power and improves the visibility of the image voxels.

SUMMARY OF THE INVENTION

A 3D volumetric display is produced by using a laser in conjunction with acousto-optic scanning and a rotating helical projection surface. Random access scanning is used to deflect the laser beam to the x,y coordinates of each image voxel. The illuminating laser beam is switched sequentially among the several acousto-optic deflecting channels. Switching among the channels can be accomplished by using a Pockels cell device. Alternatively switching may be produced by using a moving mirror or a rotating disk. The timing of the blanking, switching and deflecting signals is coordinated to produce high speed, high resolution, efficient 3D images.

The invention may also be characterized as an optical switch for selectively directing an optical signal along one or another of two axes. The optical switch includes a Pockels cell for transforming a first polarization state of the optical signal into a second polarization state in response to receiving an input signal; and a birefringent mirror which allows the optical signal to propagate along a first axis when the optical signal has a first polarization state, or for directing the optical signal along a second axis when the optical signal has a second polarization state.

The invention further includes a system for directing optical energy through a selected one of multiple optical modulation channels. The system includes an optical switch having first and second optical output ports for selectively directing an optical signal out of one of either a first or second optical output port; a first optical modulation channel for modulating the output signal received from the first optical output port; and a second optical modulation channel for modulating the output signal received from the second output port.

The invention may also be characterized as a method for directing an optical signal along a selected one or another of two different axes. The method includes the steps of: generating an optical signal having a first polarization state; propagating the optical signal along a first axis when the optical signal has said first polarization state; transforming the first polarization state into a second polarization state when an input signal has a first value; passing the optical signal along the first axis when the light signal has the first polarization state; or directing the optical signal along the second axis when the light signal has the second polarization state.

An important advantage of the invention is that the projected image brightness is improved. Another advantage is that efficient operation is achieved. A further advantage of the invention is that the total laser input power may be used to illuminate each image voxel. Yet another advantage of the invention is the avoidance of the time delay engendered by the acousto-optic deflector crystal fill-time. Still another advantage of the invention is that a higher data throughput rate is achieved. These and other advantages of the invention will become more readily apparent from the ensuing Specification and drawings when taken in conjunction with the appended claims.

DESCRIPTION OF THE PREFERRED EMBODIMENTS

Figure 1:
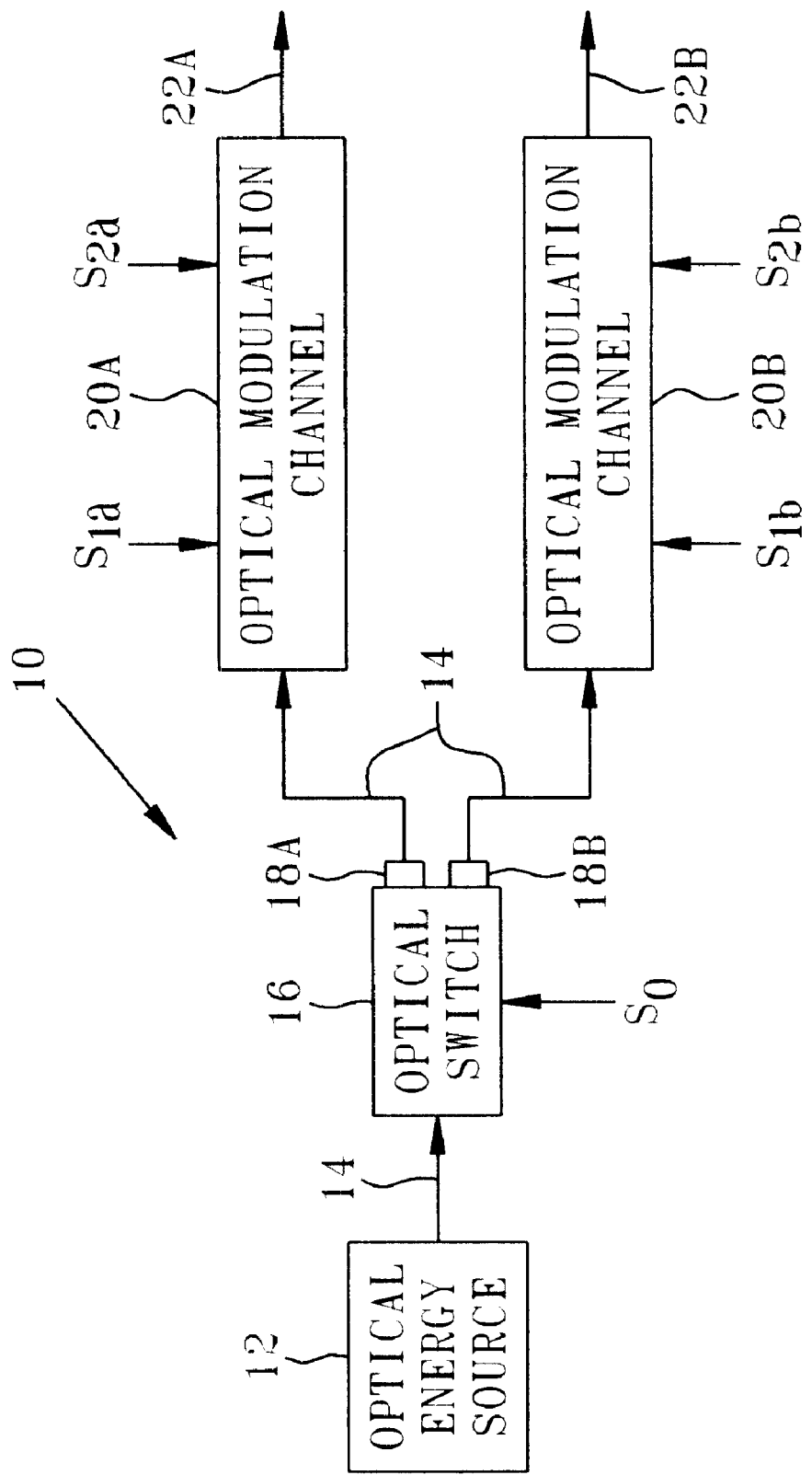
FIG. 1 is a block diagram of a system for directing optical energy through multiple optical modulation channels that embodies various features of the present invention.

Referring to FIG. 1, the present invention provides a system 10 for alternately directing optical energy through multiple optical modulation channels. System 10 includes an optical energy source 12, optical switch 16, and multiple optical modulation channels 20A and 20B. Optical energy source 12, such as a laser, generates a coherent light beam 14 which is provided to optical switch 16. Optical switch 16 selectively directs light beam 14 to either optical output ports 18A or 18B, depending on the level of voltage signal $S_0$. Optical modulation channel 20A receives light beam 14 when emitted from optical output port 18A and may selectively deflect and modulate the intensity of light beam 14 in response to input signals $S_{1a}$ and $S_{2a}$, respectively. Similarly, optical modulation channel 20B receives light beam 14 when emitted from optical output port 18B and may selectively deflect and modulate the intensity of light beam 14 in response to input signals $S_{1b}$ and $S_{2b}$, respectively. An important advantage of the present invention is that it does not split light beam 14 as the beam shifts between optical modulation channels 20A and 20B. Rather, optical switch 16 directs the entire beam either out of optical port 18A or 18B.

Figure 2:
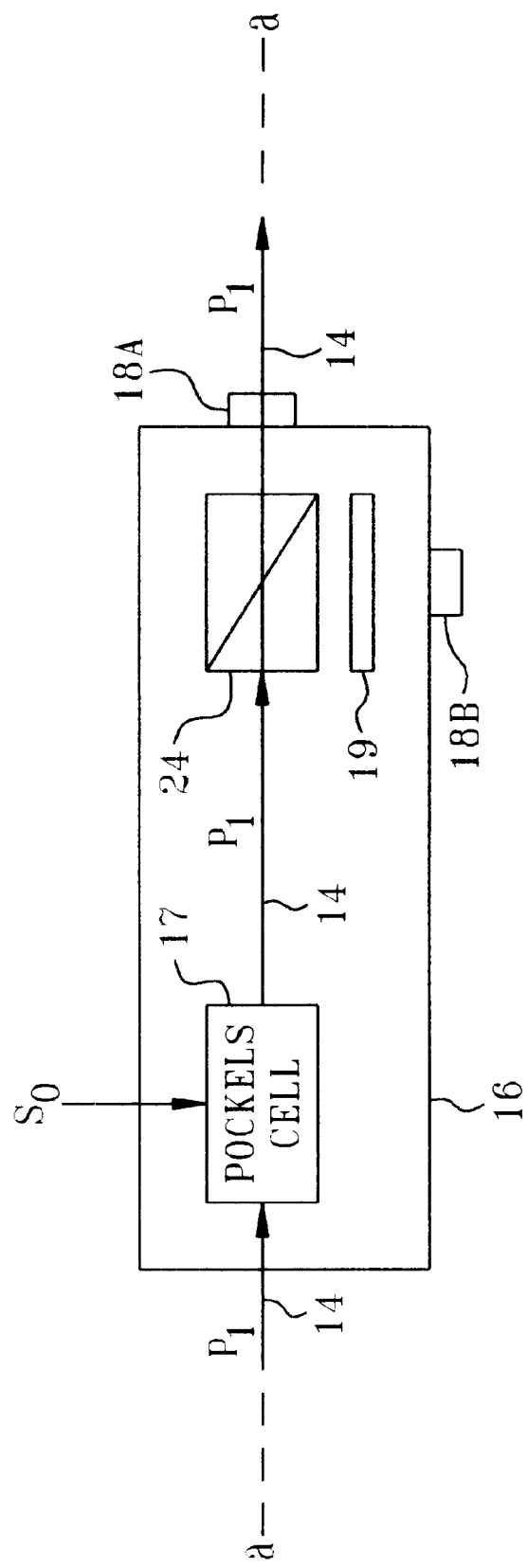
FIG. 2 is a detailed view of the optical switch showing the light beam having polarization characteristics $p_1$ being transmitted through the birefringent reflector and out of the switch through optical port 18A.
Figure 3:
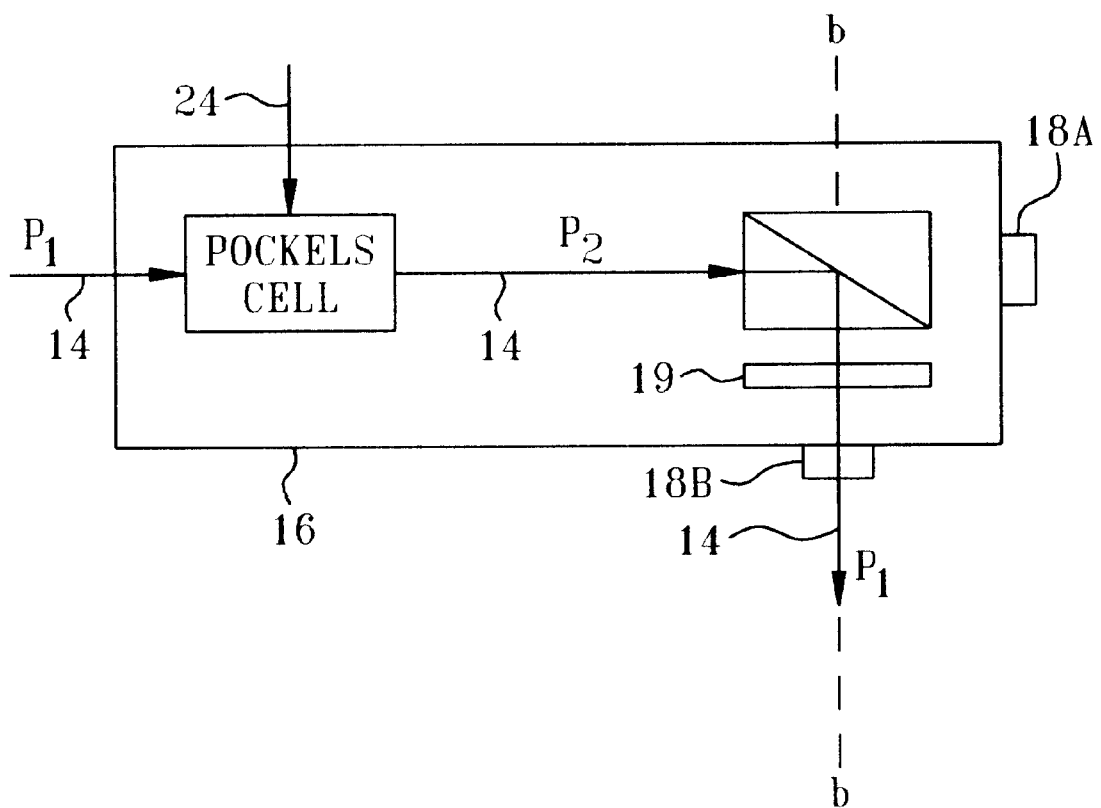
FIG. 3 is a detailed view of the optical switch showing the light beam having polarization characteristics $p_2$ (orthogonal to $p_1$) being reflected by the birefringent reflector so that the beam is directed through the waveplate out of optical port 18B.

Referring to FIG. 2 optical switch 16 is shown to include a first optical element such as a Pockels cell 17 and a second optical element such as a polarizing beam splitter 24. When a voltage is applied to a Pockels cell, the first optical element it rotates the polarization of an optical beam passing through the cell. When the second optical element is implemented as a polarizing beam splitter 24 or birefringent mirror, the second optical element reflects optical beam 14 when optical beam 14 has a polarization field orthogonal to the polarization plane of beam splitter 24, and is transmissive to light having a polarization field parallel to the polarization plane of the beam splitter. Light beam 14 enters Pockels cell 17 having polarization characteristics along polarization plane $p_1$ When the voltage level of signal $S_0$ is below a predetermined threshold, optical beam 14 propagates through Pockels cell 17 without undergoing any change in its polarization characteristics. In such case, optical beam 14 propagates through beam splitter 24 along axis a—a without being deflected. Optical beam then exits the optical switch 16 through optical port 18A. However, if the level of voltage signal $S_0$ exceeds the predetermined value, then Pockels cell 17 rotates the polarization field of optical beam 14 to polarization plane $p_2$, which is orthogonal to polarization plane $p_1$. Optical beam 14 then is reflected by polarizing beam splitter 24 through half waveplate 19 along axis b—b and emitted out of optical port 18B, as shown in FIG. 3. Polarizing beam splitter 24 is transmissive to light having polarization $p_1$, but reflects light having polarization $p_2$. Waveplate 19 is used to rotate the polarization field of light beam 14 from polarization $p_2$ back to polarization $p_1$ because the optical modulation channels require light having one of either polarization fields $p_1$ or $p_2$.

Figure 4:
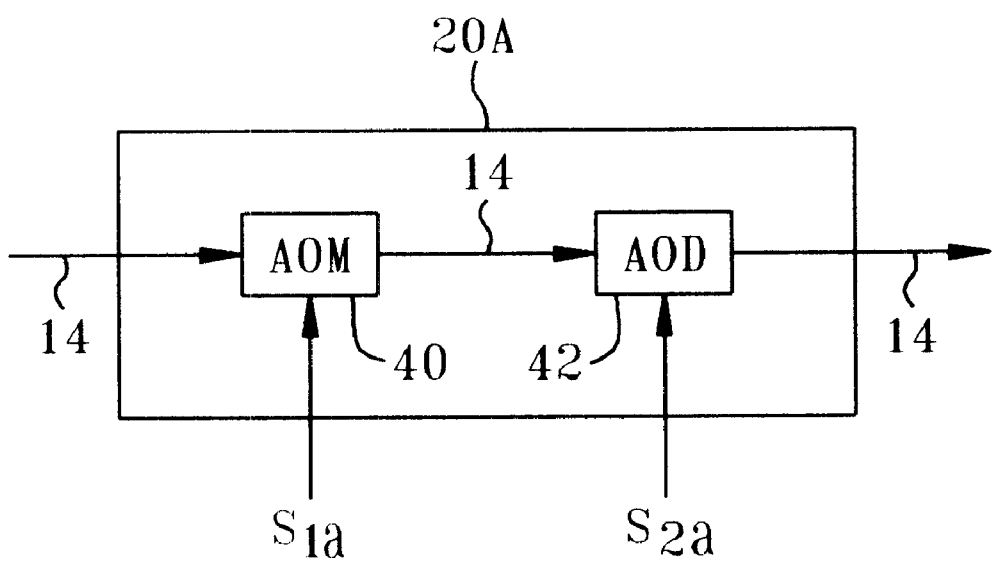
FIG. 4 is a detailed view of optical modulation channel 20A.
Figure 5:
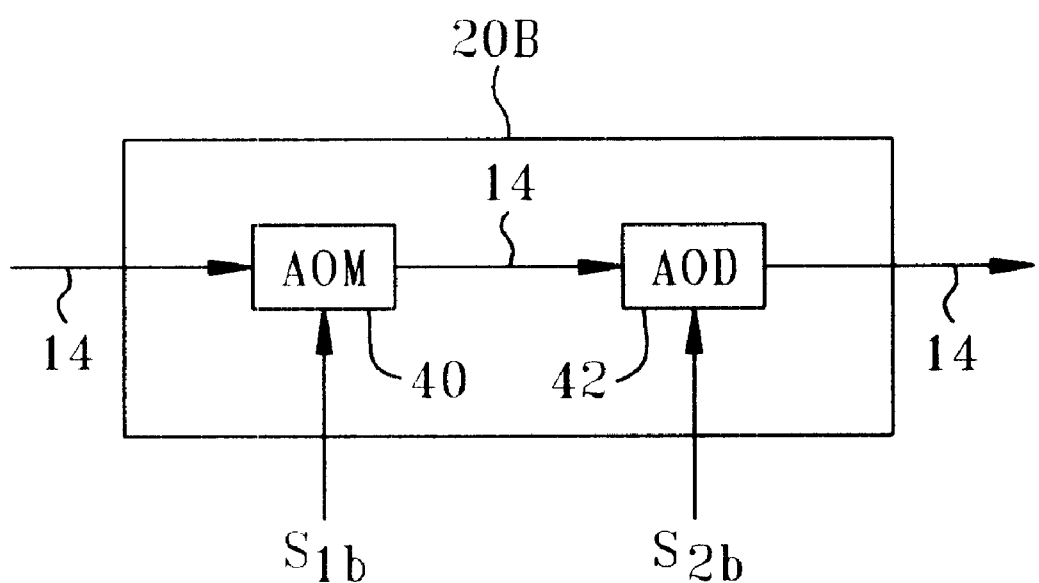
FIG. 5 is a detailed view of optical modulation channel 20B.

FIG. 4 illustrates an example of optical modulation channel 20A. Referring to FIG. 4, optical modulation channel 20A includes acousto-optic modulator 40 and acousto-optic deflector 42. Optical modulation channel 20A modulates the intensity of light beam 14, including blanking light beam 14 when appropriate, in response to the voltage level of signal $S_{1a}$. Acousto-optic deflector 42 deflects light beam 14 in response to the voltage level of signal $S_{2a}$ so that the beam may be directed to particular coordinates of a light reflecting medium, such as a rotating helix, as described in commonly assigned U.S. Pat. No. 5,854,613, LASER BASED 3D VOLUMETRIC DISPLAY SYSTEM, incorporated herein by reference. As shown in FIG. 5, optical modulation channel 20B is identical in construction to optical modulation channel 20A. However, acousto-optic modulator 40 and acousto-optic deflector 42 respond to the voltage levels of signals $S_{1b}$ and $S_{2b}$, respectively.

Figure 6:
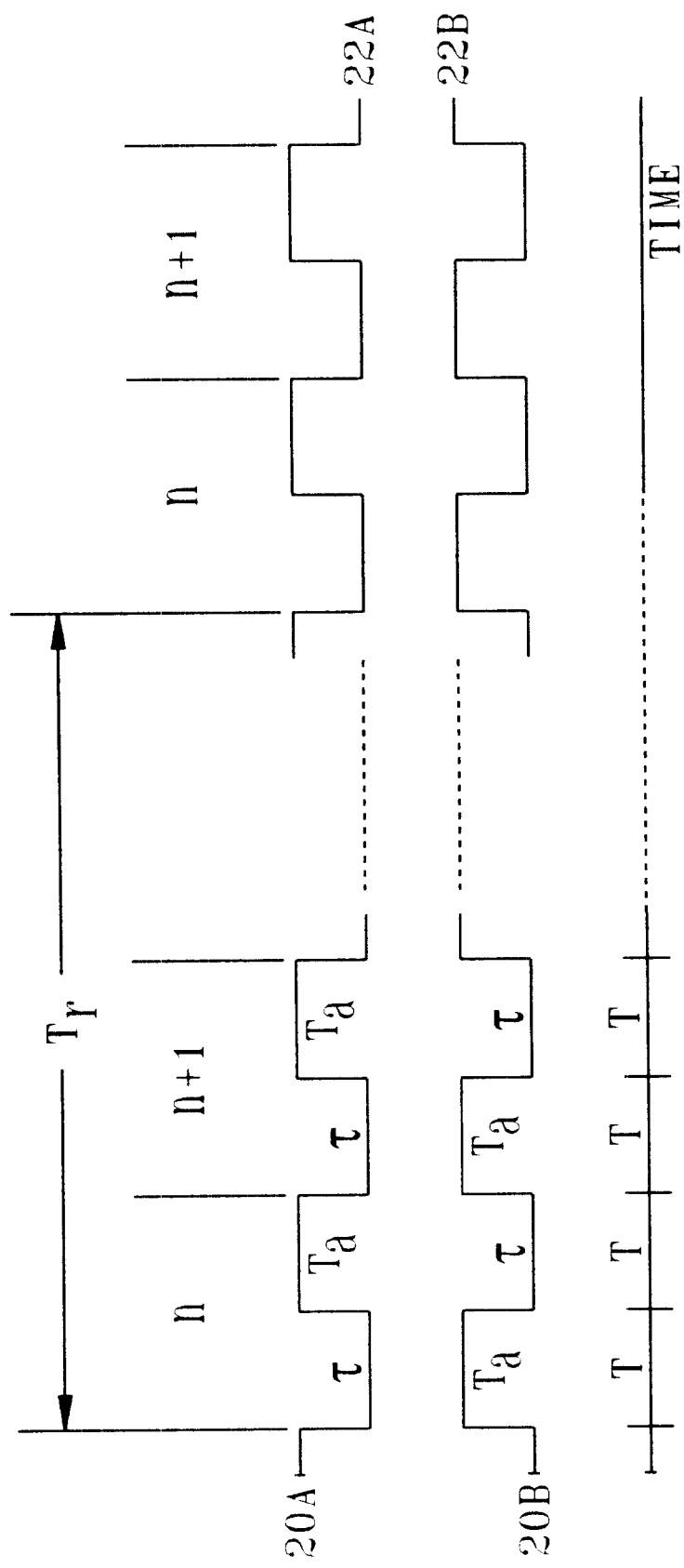
FIG. 6 shows the timing of the optical switch whereby light beam 14 is alternately directed to optical modulation channels 20A and 20B. Throughout the several views like elements are referenced using like references.

The timing of the optical output signal from channels 20A and 20B is shown in FIG. 6, where $T_r$ represents the refresh time. The refresh time is the period of time required to display all of the image voxels, and is generally about 0.05 seconds so that it is shorter than the flicker rate of human vision. The fill time is represented by $\tau$, and n and (n+1) represent the time for the $n^{th}$ and $(n+1)^{th}$ voxels to be produced by the alternately output light signals 22A and 22b from each of channels 20A and 20B, respectively. $T_\alpha$ is the active illumination time for each voxel, representing the on-time during which one of light signals 22A or 22B is alternately output from channels 20A or 20B, respectively. The time axis is represented by time, T, where T is the refresh time divided by the total number of voxels that comprise an image which is to be illuminated by light signals 22A and 22B. From FIG. 6, it may be appreciated that two voxels may be alternatively projected by light signals 22A and 22B, respectively, during the interval 2T. FIG. 6 illustrates the case where $T=\tau$, and $\tau=T_\alpha$, the preferred operating mode of the present invention.

While the present invention has been described in terms of preferred embodiments, it is to be understood that the invention is not limited to the exact from of the apparatus or process disclosed. Therefore, it is to be understood that the invention may be practiced other than as specifically described without departing from the scope of the claims.

We claim:

1. A system for directing optical energy through multiple optical modulation channels, comprising:

an optical switch having first and second optical output ports for selectively directing an optical signal out of said first or second optical output ports;

wherein said optical switch further includes:
      a Pockels cell for selectively transforming said optical signal between first and second polarization states;
      a birefringent mirror for directing said optical signal through said first optical output port when said optical signal has said first polarization state, and directing said optical signal through said second optical output port when said optical signal has said second polarization state; and
      a waveplate for transforming said second polarization state into said first polarization state;

a first optical modulation channel for modulating said optical signal received from said first optical output port;

a second optical modulation channel for modulating said optical signal received from said second optical output port; and wherein said first and second optical modulation channels each includes an acousto-optic modulator for intensity modulating said optical signal.

2. A system for directing optical energy through multiple optical modulation channels, comprising:

an optical switch having first and second optical output ports for selectively directing an optical signal out of said first or second optical output ports;

a first optical modulation channel for modulating said optical signal received from said first optical output port;

a second optical modulation channel for modulating said optical signal received from said second output port; and wherein said first and second optical modulation channels each includes an acousto-optic modulator for intensity modulating said optical signal, and an acousto-optic deflector for deflecting said optical signal.

3. A system for directing optical energy through multiple optical modulation channels, comprising:

an optical switch having first and second optical output ports for selectively directing an optical signal out of said first or second optical output ports;

wherein said optical switch further includes:
      a Pockels cell for selectively transforming said optical signal between first and second polarization states;
      a birefringent mirror for directing said optical signal through said first optical output port when said optical signal has said first polarization state, and directing said optical signal through said second optical output port when said optical signal has said second polarization state; and
      a waveplate for transforming said second polarization state into said first polarization state;

a first optical modulation channel for modulating said optical signal received from said first optical output port;

a second optical modulation channel for modulating said optical signal received from said second optical output port; and wherein said first and second optical modulation channels each includes an acousto-optic deflector for deflecting said optical signal.

4. The system of claim 2 wherein said optical switch includes:

a Pockels cell for selectively transforming said optical signal between first and second polarization states;

a birefringent mirror for directing said optical signal through said first optical output port when said optical signal has said first polarization state, and directing said optical signal through said second optical output port when said optical signal has said second polarization state; and a waveplate for transforming said second polarization state into said first polarization state.

* * * * *